United States Patent
Maruno

(10) Patent No.: US 9,291,853 B2
(45) Date of Patent: Mar. 22, 2016

(54) DISPLAY DEVICE

(71) Applicant: Funai Electric Co., Ltd., Daito-shi, Osaka (JP)

(72) Inventor: Masashi Maruno, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 107 days.

(21) Appl. No.: 14/157,073

(22) Filed: Jan. 16, 2014

(65) Prior Publication Data

US 2014/0218656 A1 Aug. 7, 2014

(30) Foreign Application Priority Data

Feb. 5, 2013 (JP) ................................. 2013-020680

(51) Int. Cl.
*G02F 1/1333* (2006.01)
*G02F 1/1335* (2006.01)

(52) U.S. Cl.
CPC ................................. *G02F 1/133608* (2013.01)

(58) Field of Classification Search
CPC ................................................ G02F 1/133308
USPC ........................................................... 349/58
See application file for complete search history.

(56) References Cited

U.S. PATENT DOCUMENTS

| | | | |
|---|---|---|---|
| 2004/0189889 A1* | 9/2004 | Nitto et al. | 349/58 |
| 2005/0141245 A1* | 6/2005 | Sugahara et al. | 362/633 |
| 2005/0151894 A1* | 7/2005 | Katsuda et al. | 349/58 |
| 2010/0253874 A1* | 10/2010 | Ito | G02F 1/133308 349/58 |
| 2011/0261538 A1* | 10/2011 | Kawada | G06F 1/1601 361/724 |
| 2012/0002135 A1* | 1/2012 | Hiraguri | 349/61 |
| 2012/0300135 A1* | 11/2012 | Cho | 348/739 |
| 2013/0039021 A1* | 2/2013 | Liu | 361/748 |

FOREIGN PATENT DOCUMENTS

| | | | | |
|---|---|---|---|---|
| JP | 2006-235425 A | | 9/2006 | |
| JP | 2008-203319 | * | 9/2008 | ............ G02F 1/1333 |
| JP | 2008-203319 A | | 9/2008 | |
| JP | 2008-286860 A | | 11/2008 | |
| JP | 2009-134269 A | | 6/2009 | |

* cited by examiner

*Primary Examiner* — Sang V Nguyen
(74) *Attorney, Agent, or Firm* — Crowell & Moring LLP

(57) ABSTRACT

A display device includes a display portion, a front housing holding the display portion while pushing at least a part of an edge on the front side of the display portion, and a first bezel member made of metal, arranged inside the front housing.

19 Claims, 5 Drawing Sheets

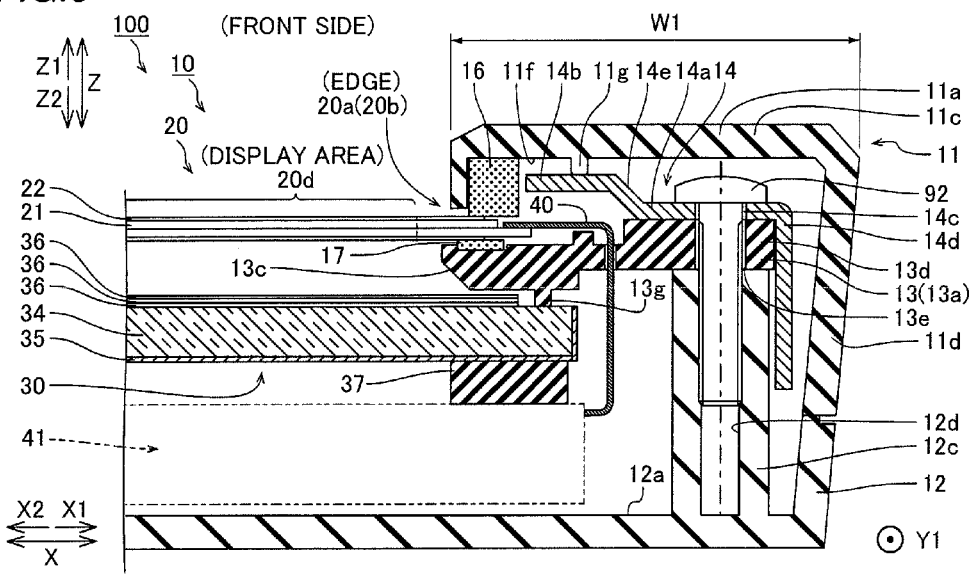
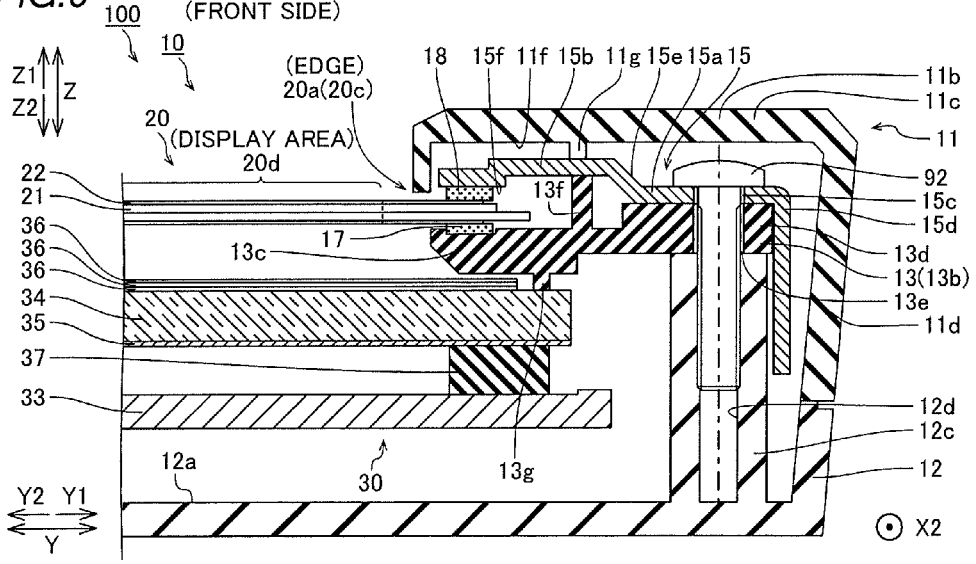

(FIRST MODIFICATION)

(SECOND MODIFICATION)

DISPLAY DEVICE

BACKGROUND OF THE INVENTION

1. Field of the Invention

The present invention relates to a display device, and more particularly, it relates to a display device including a display portion and a front housing.

2. Description of the Background Art

A display device including a display portion and a front housing is known in general, as disclosed in Japanese Patent Laying-Open No. 2008-286860, for example.

The aforementioned Japanese Patent Laying-Open No. 2008-286860 discloses a liquid crystal display device including a liquid crystal panel (display portion) and a front housing made of metal, holding the liquid crystal panel. In this liquid crystal display device described in Japanese Patent Laying-Open No. 2008-286860, the front housing has a frame portion formed in a frame shape along the outer edge of the liquid crystal panel and a side surface portion folded rearward from the frame portion to form a side surface of a liquid crystal display device body. The outer edge (non-display area) of the liquid crystal panel is pushed through a cushion member coming into contact with the rear surface of the frame portion, whereby the liquid crystal panel is held at a prescribed position inside the body.

In the liquid crystal display device described in Japanese Patent Laying-Open No. 2008-286860, however, it is necessary to ensure prescribed rigidity (member strength) in the front housing whereas the width of the frame portion surrounding the outer edge of the liquid crystal panel is reduced so that the width of a frame is reduced. Thus, the reduction in the width of the frame resulting from the reduction in the width of the frame portion is limited. In other words, the width of the frame cannot be more efficiently reduced while the rigidity of the liquid crystal display device body is ensured by the front housing.

SUMMARY OF THE INVENTION

The present invention has been proposed in order to solve the aforementioned problem, and an object of the present invention is to provide a display device capable of further reducing the width of a frame while ensuring the rigidity of an apparatus body.

A display device according to an aspect of the present invention includes a display portion, a front housing holding the display portion while pushing at least a part of an edge on the front side of the display portion, and a first bezel member made of metal, arranged inside the front housing.

As hereinabove described, the display device according to the aspect of the present invention includes the front housing holding the display portion while pushing at least the part of the edge on the front side of the display portion and the first bezel member made of metal, arranged inside of the front housing, whereby the rigidity (member strength) of a display device body including the display portion can be maintained by the first bezel member made of metal, constituted by a member different from the front housing even in the case where the front housing holds the display portion while pushing at least the part of the edge on the front side of the display portion. In other words, the rigidity of the display device body is maintained by the first bezel member, and hence the display portion can be held even in a state of ensuring a display area of the display portion as wide as possible. Thus, the width of a frame can be further reduced while the rigidity of the display device body is ensured.

The aforementioned display device according to the aspect preferably further includes a supporting member configured to be capable of supporting the rear side of the display portion inside the front housing, and the display portion is preferably sandwiched and held by the front housing and the supporting member from the front side and the rear side in a state where the first bezel member is mounted on the supporting member. According to this structure, the first bezel member is mounted on the supporting member supporting the display portion from the rear side in the case where the edge on the front side of the display portion is pushed, and hence the rigidity (member strength) of the supporting member can be easily improved. Therefore, the rigidity of the display device body in the display device having the display portion sandwiched and held by the front housing and the supporting member can be easily ensured.

In the aforementioned structure further including the supporting member, the front housing preferably includes a frame portion formed in a frame shape without covering a display area of the display portion, and at least the part of the edge on the front side of the display portion is preferably pushed by the frame portion of the front housing and the rear side of the display portion corresponding to a position pushed by the frame portion is preferably supported by the supporting member in the state where the first bezel member is mounted on the supporting member, so that the display portion is held by the front housing and the supporting member. Thus, even in the case where the frame portion formed in the frame shape holds the display portion while pushing at least the part of the edge on the front side of the display portion, the rigidity of the display device body is easily ensured by the first bezel member, and hence the width of the frame portion is reduced as much as possible, whereby a reduction in the width of the frame can be easily realized.

In the aforementioned structure in which the front housing includes the frame portion, the display portion is preferably formed to have a rectangular shape by a pair of short-side portions extending in a longitudinal direction and a pair of long-side portions extending in a transverse direction, the first bezel member is preferably mounted on a portion of the supporting member supporting the rear side at a position corresponding to each of at least the short-side portions of the display portion, and the edge corresponding to at least the short-side portions of the display portion is preferably pushed by the frame portion of the front housing and the rear side of the display portion corresponding to the position pushed by the frame portion is preferably supported by the supporting member, so that the display portion is held by the front housing and the supporting member. According to this structure, in the display device including the horizontally long (rectangular) display portion, the width of the frame on the sides of the short-side portions (both sides in the transverse direction) can be reduced while the rigidity of the display device body is ensured. Therefore, the transverse dimension (outer dimension) of the display device body can be reduced as much as possible while the transverse (long-side) dimension of the display area in the display portion is maximized.

In the aforementioned structure in which the front housing includes the frame portion, the display device preferably further includes a first elastic member arranged between the frame portion of the front housing and the edge on the front side of the display portion, the first bezel member is preferably mounted on the supporting member in a region opposed to the supporting member inside the front housing and outside the edge on the front side of the display portion, and the first elastic member is preferably pushed by the frame portion of the front housing and comes into contact with at least the part of the edge on the front side of the display portion, so that the display portion is held. According to this structure, the first elastic member is deformed due to the pushing force of the frame portion and comes into close contact with the edge on the front side of the display portion in a state where the frame portion formed in the frame shape holds the display portion, and hence the region opposed to the supporting member inside the front housing is shielded by a surface of the display portion and the first elastic member and is not visible from the front side of the display portion. In other words, the first bezel member mounted on the supporting member in the region opposed to the supporting member inside the front housing is not visible from the front side of the display portion, and entry of extraneous material from the front side can be suppressed.

In the aforementioned structure further including the first elastic member, the display device preferably further includes a second elastic member arranged between the supporting member and the rear side of the display portion corresponding to the position pushed by the frame portion, and the rear side of the display portion corresponding to the position pushed by the frame portion is preferably supported by the supporting member through the second elastic member, so that the display portion is held. According to this structure, the front side and the rear side of the display portion can be sandwiched and held by both the first and second elastic members, and hence the display portion can be reliably held. Consequently, the positional displacement of the display portion can be suppressed, and hence a situation where a user must view an inclined display image can be suppressed.

In the aforementioned structure further including the first elastic member, the first bezel member preferably includes a fixed portion coming into contact with the supporting member, fixed to the supporting member and an extension portion formed to extend from the fixed portion up to the vicinity of a region where the first elastic member is arranged. According to this structure, the first bezel member is provided with not only the fixed portion but also the extension portion, and hence the first bezel member arranged inside the front housing can be formed to have larger rigidity (member strength). Furthermore, the extension portion provided on the first bezel member is formed to extend up to the vicinity of the region where the first elastic member is arranged, and hence external force (impulsive force) can be absorbed by further deformation of the first elastic member even in the case where the first elastic member is deformed due to the pushing force of the frame portion or sudden external force and comes into contact with the extension portion of the first bezel member. Thus, application of the sudden external force (impulsive force) to the first bezel member is suppressed, and hence distortion of the display device body can be suppressed.

In the aforementioned structure further including the supporting member, each of the first bezel member and the supporting member preferably has a through-hole provided to fasten the first bezel member and the supporting member to each other by a fastening member. According to this structure, the first bezel member and the supporting member can be fastened together by the fastening member, and hence the first bezel member can be reliably mounted on the supporting member. Consequently, the rigidity (member strength) of the supporting member can be reliably improved.

In this case, the display device preferably further includes a rear housing, and each of the first bezel member and the supporting member is preferably configured to be fastened to the rear housing by the fastening member through the through-hole. According to this structure, the first bezel member, the supporting member, and the rear housing can be strongly fixed by the fastening member, and hence the rigidity of the display device body can be easily ensured.

The aforementioned display device according to the aspect preferably further includes a second bezel member made of metal, arranged inside the front housing, and the part of the edge on the front side of the display portion is preferably pushed by the front housing and the edge of the display portion other than the part pushed by the front housing is preferably pushed by the second bezel member, so that the display portion is held by the front housing and the second bezel member. According to this structure, the width of the frame along the edge of the display portion held by the front housing can be actively reduced, and the second bezel member can push the edge of the display portion of a portion requiring larger rigidity in the display device body and hold the display portion while the rigidity of the portion requiring larger rigidity in the display device body is ensured by the second bezel member. Therefore, the display device in which the width of the frame is actively reduced and the rigidity of the display device body is reliably ensured can be obtained.

In the aforementioned structure further including the second bezel member made of metal, the first bezel member and the second bezel member are preferably coupled to each other to form a frame-shaped bezel member. According to this structure, the first bezel member and the second bezel member are coupled to each other as the single frame-shaped bezel member, and hence the rigidity of the bezel member constituted by the coupled first and second bezel members can be further improved, unlike the case where the first bezel member and the second bezel member are not coupled but mounted separately. Consequently, the rigidity of the display device body can be more reliably ensured, and the width of the frame can be more actively reduced.

In this case, the display portion is preferably formed to have a rectangular shape by a pair of short-side portions extending in a longitudinal direction and a pair of long-side portions extending in a transverse direction, a pair of first bezel members are preferably provided, each of the pair of first bezel members is preferably arranged at a position corresponding to each of the pair of short-side portions of the display portion, a pair of second bezel members are preferably provided, each of the pair of second bezel members is preferably arranged at a position corresponding to each of the pair of long-side portions of the display portion, and the pair of first bezel members and the pair of second bezel members preferably form the frame-shaped bezel member surrounding the display portion. According to this structure, the pair of first bezel members and the pair of second bezel members form the frame-shaped member surrounding the display portion in correspondence to the display portion having the rectangular shape, whereby the edge of the display portion can be reliably pushed while the rigidity of the bezel member is further improved.

In the aforementioned display device according to the aspect, the first bezel member preferably includes a fixed portion coming into contact with the supporting member, fixed to the supporting member and an extension portion having a bent portion that is bent, extending from the fixed portion toward the edge of the display portion pushed by the front housing. According to this structure, the extension portion has the bent portion that is bent, whereby the rigidity (member strength) of the first bezel member can be further improved, unlike the case where the extension portion is flatly formed.

In the aforementioned structure in which the first bezel member includes the extension portion, the bent portion of the extension portion of the first bezel member is preferably formed by folding or hemming. According to this structure, the bent portion of the extension portion is formed by folding or hemming, whereby not only the rigidity of the extension portion but also the rigidity (member strength) of the entire first bezel member can be further improved. Therefore, the first bezel member can be formed with less metal material in the case where the first bezel member is formed to ensure prescribed rigidity, and hence the weight (thickness) of the first bezel member can be reduced.

In the aforementioned structure in which the first bezel member includes the extension portion, the first bezel member preferably further includes a side surface portion extending from an outer edge of the fixed portion opposite to the extension portion along a direction from the front side of the display portion toward the rear side of the display portion. According to this structure, the first bezel member is provided with the side surface portion in addition to the extension portion having the bent portion, whereby the rigidity (member strength) of the first bezel member can be further improved.

In the aforementioned structure in which the first bezel member includes the extension portion, the display device preferably further includes a wiring portion configured to connect the display portion to a control board, and the extension portion of the first bezel member is preferably formed such that at least a part of the extension portion covers the wiring portion. According to this structure, the wiring portion can be protected by the extension portion of the first bezel member made of metal when electrostatic discharge is generated, and hence malfunction or damage of the wiring portion and the control board connected to the wiring portion resulting from the electrostatic discharge can be suppressed.

In this case, the extension portion of the first bezel member is preferably arranged to cover the wiring portion from the front side of the display portion. According to this structure, the wiring portion can be protected by the extension portion of the first bezel member made of metal on the front side of the display portion where the electrostatic discharge is easily generated, and hence malfunction or damage of the wiring portion and the control board connected to the wiring portion resulting from the electrostatic discharge can be reliably suppressed.

In the aforementioned structure further including the supporting member, the supporting member is preferably formed with a supporting member side contact portion protruding toward the display portion, coming into contact with the first bezel member. According to this structure, the supporting member side contact portion coming into contact with the first bezel member can suppress the movement of the first bezel member, and hence backlash of the first bezel member can be suppressed.

In this case, the front housing is preferably formed with a front housing side contact portion protruding inward from the inner surface of the front housing, coming into contact with a surface of the first bezel member opposite to a surface of the first bezel member coming into contact with the supporting member side contact portion, and the supporting member side contact portion and the front housing side contact portion are preferably arranged to be opposed to each other. According to this structure, the first bezel member can be sandwiched by the supporting member side contact portion and the front housing side contact portion from both sides, and hence the movement of the first bezel member can be more reliably suppressed. Thus, backlash of the first bezel member can be further suppressed.

In the aforementioned structure further including the supporting member, the front housing and the supporting member are preferably made of resin. According to this structure, the front housing and the supporting member can be easily molded, and the weight of the display device body can be reduced as compared with the case where the front housing is made of metal. In the case where the front housing is made of resin, it is more difficult to reduce the width of the frame while the rigidity is ensured, unlike the case where the front housing is made of metal. In this case, the first bezel member made of metal is provided, whereby the width of the frame can be reduced while the rigidity of the display device body is ensured, and hence the present invention is particularly effective.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a sectional view at a different position from FIG. 4 showing the structure of holding the liquid crystal panel as viewed along the short-side direction (direction Y) of the liquid crystal panel in the liquid crystal television apparatus according to the embodiment of the present invention;

FIG. 6 is a sectional view showing the structure of holding the liquid crystal panel as viewed along the long-side direction (direction X) of the liquid crystal panel in the liquid crystal television apparatus according to the embodiment of the present invention;

DESCRIPTION OF THE PREFERRED EMBODIMENTS

An embodiment of the present invention is hereinafter described with reference to the drawings.

The structure of a liquid crystal television apparatus 100 according to the embodiment of the present invention is now described with reference to FIGS. 1 to 6. The liquid crystal television apparatus 100 is an example of the "display device" in the present invention.

Figure 1:
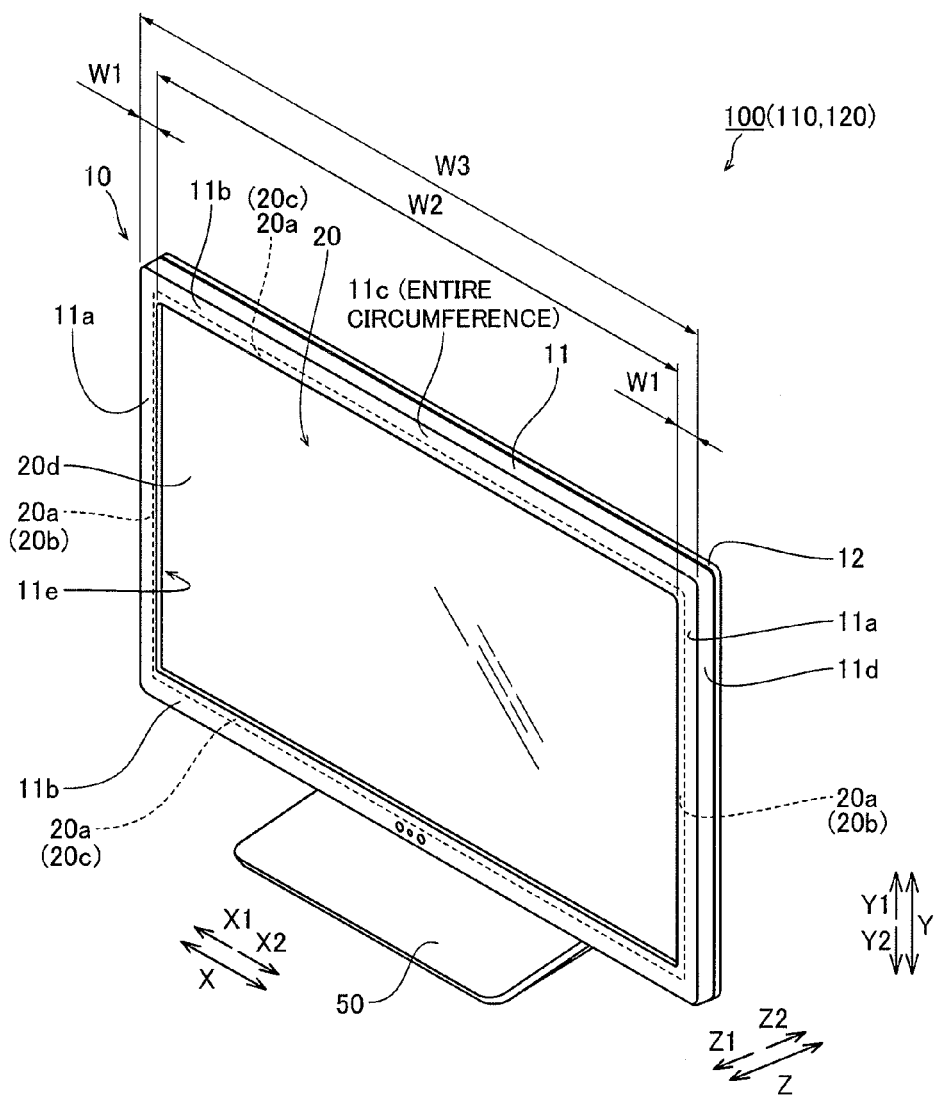
FIG. 1 is a perspective view showing the overall structure of a liquid crystal television apparatus according to an embodiment of the present invention.

The liquid crystal television apparatus 100 according to the embodiment of the present invention includes an apparatus body 10 with a built-in liquid crystal panel 20 and a stand 50 supporting the apparatus body 10 from below (Y2 side) in a state where the liquid crystal panel 20 is stood, as shown in FIG. 1. A Z1 side is the front side of the apparatus body 10, and a Z2 side is the rear side (back side) of the apparatus body 10. The liquid crystal panel 20 is an example of the "display portion" in the present invention.

Figure 2:
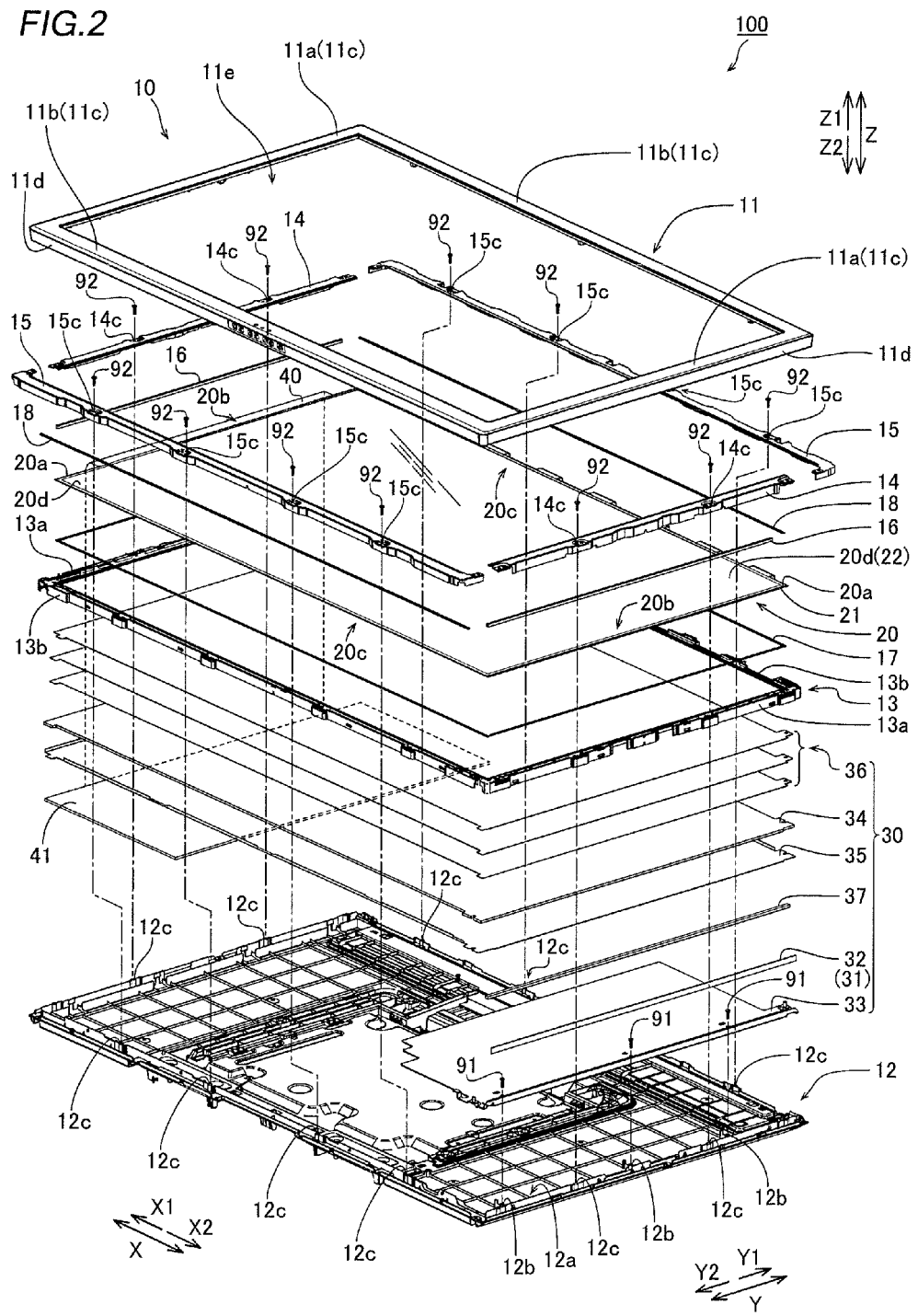
FIG. 2 is an exploded perspective view showing the structure of an apparatus body of the liquid crystal television apparatus according to the embodiment of the present invention.

The liquid crystal television apparatus 100 includes a front housing (front cabinet) 11 made of resin and a rear housing (rear cabinet) 12 made of resin. Specifically, the front housing 11 is fitted into the rear housing 12 while enclosing an edge 20a (see FIG. 2) of the liquid crystal panel 20 from the Z1 side (front side) in a state where the rear housing 12 is arranged on the Z2 side (rear side) of the liquid crystal panel 20, whereby the liquid crystal panel 20 is internally held (stored). The liquid crystal panel 20 is formed to have a rectangular shape constituted by a pair of short-side portions 20b extending in a longitudinal direction (direction Y) and a pair of long-side portions 20c extending in a transverse direction (direction X), as shown in FIG. 2. The liquid crystal panel 20 has a display area 20d on which a picture (image) is displayed inside the peripheral (rectangular frame-shaped) edge 20a (see FIG. 2).

The liquid crystal panel 20 includes a liquid crystal cell 21 (see FIG. 3) having a structure of holding a liquid crystal layer between an array substrate and a color filter substrate and a protective film 22 (see FIG. 3) applied onto the substantially entire surface of the liquid crystal cell 21 on the front side. As shown in FIG. 2, a flexible printed circuit board (FPC) 40 is connected to the liquid crystal cell 21 at the edge 20a corresponding to a short-side portion 20b on an X1 side of the liquid crystal panel 20. The FPC 40 is connected to a control board portion 41 configured to drive the liquid crystal cell 21. The flexible printed circuit board (FPC) 40 is an example of the "wiring portion" in the present invention.

The front housing (front cabinet) 11 is configured to surround the liquid crystal panel 20 formed in a rectangular shape by a pair of side portions 11a extending parallel to each other along the longitudinal direction (direction Y) and a pair of side portions 11b extending parallel to each other along the transverse direction (direction X). The side portions 11b in the direction X are longer than the side portions 11a in the direction Y. The front housing 11 is a resin molded article having an integral structure including a peripheral (rectangular frame-shaped) frame portion 11c including these four side portions (the pair of side portions 11a and the pair of side portions 11b) and a frame-shaped side surface portion 11d extending rearward (along arrow Z2) from the outer edge of the frame portion 11c. The display area 20d of the liquid crystal panel 20 is not covered but exposed to the front side (Z1 side) by a rectangular opening 11e formed on the inner peripheral side of the frame portion 11c.

The liquid crystal television apparatus 100 includes an edge light type backlight portion 30, as shown in FIG. 2. The backlight portion 30 includes an LED substrate 32 mounted with a plurality of LEDs 31 (see FIG. 4) in a line in the direction Y, extending in the form of a strip in the direction Y, a radiator plate (heat sink) 33 made of sheet metal, configured to radiate heat of the LED substrate 32, and a light guide plate 34 made of transparent acrylic resin having translucency. The backlight portion 30 further includes a reflective plate 35 arranged on the rear side (Z2 side) of the light guide plate 34, reflecting light emitted from the LEDs 31 to the front side (Z1 side), optical sheets (light diffusion sheets) 36 stacked with a multi-layer (three-layer) structure on the front side (Z1 side) of the light guide plate 34, and a spacer member 37 configured to ensure a prescribed space on the back side of the reflective plate 35 (light guide plate 34).

Figure 3:
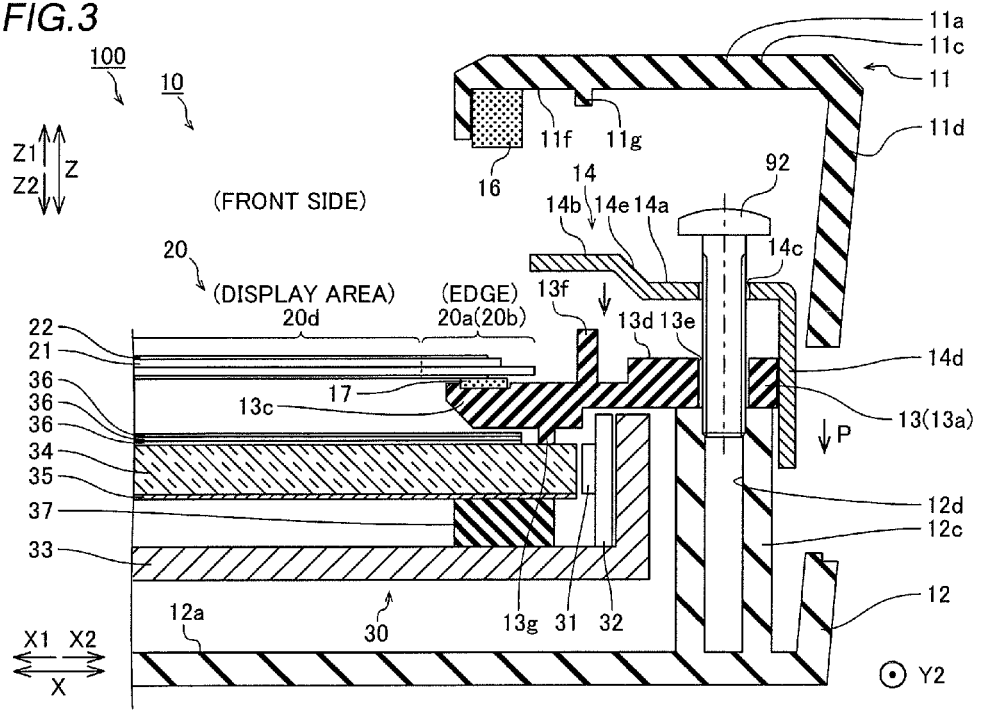
FIG. 3 is a sectional view showing a structure of holding a liquid crystal panel as viewed along the short-side direction (direction Y) of the liquid crystal panel when the apparatus body is assembled in the liquid crystal television apparatus according to the embodiment of the present invention.

Thus, the backlight portion 30 is arranged between the rear side (Z2 side) of the liquid crystal panel 20 and a back surface portion 12a of the rear housing (rear cabinet) 12 in a state where the reflective plate 35, the light guide plate 34, and the three optical sheets 36 are stacked in this order on the radiator plate 33 through the spacer member 37, as shown in FIG. 3. A plurality of boss portions 12b (see FIG. 2) protruding toward the front side (Z1 side) are provided on the back surface portion 12a of the rear housing 12 by resin molding. The radiator plate 33 is mounted on the boss portions 12b by screw members 91 (see FIG. 2). Thus, a space is formed between the radiator plate 33 and the back surface portion 12a of the rear housing 12, as shown in FIG. 3, and the radiator plate 33 properly radiates heat.

Figure 4:
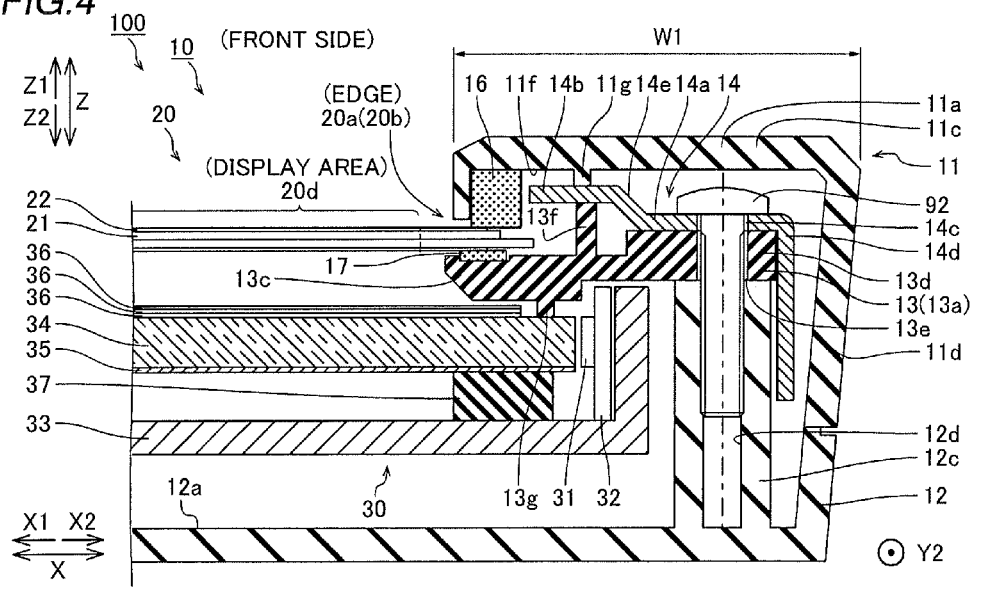
FIG. 4 is a sectional view showing the structure of holding the liquid crystal panel as viewed along the short-side direction (direction Y) of the liquid crystal panel in the liquid crystal television apparatus according to the embodiment of the present invention.

According to this embodiment, the liquid crystal television apparatus 100 includes a frame member (mold frame) 13 made of resin, a pair of bezel members 14 made of metal, and a pair of bezel members 15 made of metal, as shown in FIG. 2. The liquid crystal panel 20 is configured to be held inside the apparatus body 10 by combining two methods shown in FIGS. 3 to 6, using the front housing 11, the frame member 13, the bezel members 14, and the bezel members 15. In this case, the structure of holding the liquid crystal panel 20 on the short-side portions 20b of the liquid crystal panel 20 shown in FIGS. 3 to 5 is differentiated from the structure of holding the liquid crystal panel 20 on the long-side portions 20c of the liquid crystal panel 20 shown in FIG. 6. This point is hereinafter described in detail. The frame member 13 is an example of the "supporting member" in the present invention. The bezel members 14 and the bezel members 15 are examples of the "first bezel member" and the "second bezel member" in the present invention, respectively.

As the structure common in FIGS. 3 to 6, the frame member (mold frame) 13 has a frame shape surrounding the liquid crystal panel 20, similarly to the front housing 11. As shown in FIG. 2, the frame member 13 has a pair of short-side frame portions 13a extending along the direction Y (longitudinal direction) and a pair of long-side frame portions 13b extending along the direction X (transverse direction) integrally formed by resin molding. Therefore, FIGS. 3 to 5 show the sectional structure of the apparatus body 10 in the case where the liquid crystal panel 20 is viewed in the extensional direction (direction Y) of the short-side portions 20b (see FIG. 2), and FIG. 6 shows the sectional structure of the apparatus body 10 in the case where the liquid crystal panel 20 is viewed in the extensional direction (direction X) of the long-side portions 20c (see FIG. 2).

As shown in FIG. 3, the frame member 13 (the short-side frame portion 13a in this case) includes a supporting portion 13c supporting the edge 20a corresponding to the short-side portion 20b (see FIG. 2) of the liquid crystal panel 20 from the rear side (Z2 side) and a fixing portion 13d extending outward (along arrow X2) from the supporting portion 13c beyond the edge 20a. The edge 20a denotes a region of the liquid crystal panel 20 excluding the display area 20d. The edge 20a includes a portion slightly inside (on a side closer to the display area 20d) the edge in addition to the entire edge of the liquid crystal panel 20. The fixing portion 13d is formed with through-holes 13e into which screw members 92 can be inserted. In this case, two through-holes 13e are formed in each of the short-side frame portions 13a (see FIG. 2) on X1 and X2 sides constituting the frame member 13, and four through-holes 13e are formed in each of the long-side frame portions 13b (see FIG. 2) on Y1 and Y2 sides constituting the frame member 13. The screw members 92 are examples of the "fastening member" in the present invention.

As shown in FIGS. 3 and 4, a bezel member 14 includes a fixed portion 14a fixed to the fixing portion 13d of the frame member 13 (short-side frame portion 13a) and an extension portion 14b extending along arrow X1 from the fixed portion 14a toward the edge 20a corresponding to the short-side portion 20b of the liquid crystal panel 20. The fixed portion 14a of the bezel member 14 is formed with through-holes 14c (two through-holes 14c in FIG. 2) into which the screw members 92 can be inserted. The bezel member 14 further includes a side surface portion 14d extending rearward (along arrow Z2) from the outer edge of the fixed portion 14a opposite (X2 side) to the extension portion 14b. The extension portion 14b has a bent portion 14e that is bent. Similarly, a bezel member 15 includes a fixed portion 15a fixed to the fixing portion 13d of the frame member 13 (long-side frame portion 13b in this case) and an extension portion 15b extending along arrow Y2 from the fixed portion 15a toward the edge 20a corresponding to the long-side portion 20c of the liquid crystal panel 20, as shown in FIG. 6. The fixed portion 15a of the bezel member 15 is formed with through-holes 15c (four through-holes 15c in FIG. 2) into which the screw members 92 can be inserted. The bezel member 15 further includes a side surface portion 15d extending rearward (along arrow Z2) from the outer edge of the fixed portion 15a opposite (Y1 side) to the extension portion 15b. The extension portion 15b has a bent portion 15e that is bent.

The rear housing 12 made of resin is provided with a plurality of (twelve in this embodiment) boss portions 12c protruding forward (along arrow Z1) from the back surface portion 12a along the outer edge (directions X and Y) of the back surface portion 12a, as shown in FIG. 2. Each of the boss portions 12c is formed with a screw hole 12d (see FIG. 3), described later, for a screw member 92 to be screwed into.

The frame member 13 (short-side frame portion 13a) and the bezel member 14 made of metal are configured as described above, whereby the edge 20a corresponding to the short-side portion 20b of the liquid crystal panel 20 is held by the following structure according to this embodiment.

Specifically, the frame member 13 is placed on the rear housing 12 in a state where the backlight portion 30 is mounted on the back surface portion 12a of the rear housing 12 through the boss portions 12b (see FIG. 2), and the screw members 92 are screwed into the boss portions 12c in a state where the bezel member 14 is placed on the fixing portion 13d of the frame member 13 (short-side frame portion 13a), whereby the backlight portion 30 is held by the frame member 13 (short-side frame portion 13a) from the Z1 side (front side), as shown in FIG. 3. Then, in a state where the bezel member 14 is mounted on the frame member 13 (short-side frame portion 13a) by the screw members 92, the liquid crystal panel 20 is placed (arranged) on (the front side of) the supporting portion 13c of the frame member 13, and the front housing 11 is fitted from the front side (Z1 side) toward the rear side (Z2 side) along arrow P, whereby the edge 20a of the liquid crystal panel 20 is sandwiched and held from the front side and the rear side (in a direction Z) by the front housing 11 and the frame member 13 (short-side frame portion 13a), as shown in FIG. 4.

The supporting portion 13c is further formed with a rib 13f protruding forward from the supporting portion 13c and a rib 13g protruding rearward from the supporting portion 13c on a portion outside a portion supporting the edge 20a. Therefore, in a state where the liquid crystal panel 20 is held by the front housing 11 and the frame member 13 (short-side frame portion 13a), a surface on the Z2 side of the extension portion 14b of the bezel member 14 pushes the rib 13f along arrow Z2. Then, the supporting portion 13c pushed along arrow Z2 by the extension portion 14b pushes the light guide plate 34 along arrow Z2 through the opposite rib 13g. Thus, the light guide plate 34 is properly arranged on the radiator plate (heat sink) 33 through the spacer member 37, and the positional relationship between the light guide plate 34 and the LED substrate 32 (LEDs 31) is accurately maintained. The inner surface 11f of the frame portion 11c of the front housing 11 is formed with a rib 11g protruding rearward (to the inside of the apparatus body 10). Thus, in the state where the liquid crystal panel 20 is held by the front housing 11 and the frame member 13 (short-side frame portion 13a), the rib 11g comes into contact with a surface on the Z1 side of the extension portion 14b of the bezel member 14 from the front side toward the rear side. The rib 11g and the rib 13f are arranged to be opposed to each other. Thus, the backlash of the extension portion 14b pushing the rib 13f is suppressed. The rib 13f is an example of the "supporting member side contact portion" in the present invention. The rib 11g is an example of the "front housing side contact portion" in the present invention.

According to this embodiment, the inner surface 11f (portion opposed to the edge 20a) of the frame portion 11c of the front housing 11 is mounted with a cushion member 16 made of an elastically deformable material. Another cushion member 17 made of the same material as the cushion member 16 is provided on the supporting portion 13c of the frame member 13 (short-side frame portion 13a). Thus, the edge 20a corresponding to the short-side portion 20b of the liquid crystal panel 20 is pushed by the frame portion 11c of the front housing 11 through the cushion member 16 on the side of the short-side portion 20b of the liquid crystal panel 20, and the rear side (Z2 side) of the liquid crystal panel 20 corresponding to a position pushed by the frame portion 11c is supported by the frame member 13 (the supporting portion 13c provided on the short-side frame portion 13a) through the cushion member 17, whereby the liquid crystal panel 20 is held by the front housing 11 and the frame member 13. The cushion member 16 is an example of the "first elastic member" in the present invention. The cushion member 17 is an example of the "second elastic member" in the present invention.

Although the sectional structure on the right side (X2 side) in the case where the apparatus body 10 (see FIG. 1) is viewed from the front side is described above with reference to FIGS. 3 and 4, FIG. 5 shows the sectional structure on the left side (X1 side) in the case where the apparatus body 10 is viewed from the front side. As shown in FIG. 5, the FPC 40 connected to the liquid crystal cell 21 of the liquid crystal panel 20 passes through the frame member 13 (short-side frame portion 13a) rearward and is connected to the control board portion 41 (the schematic outer shape is shown by a two-dot chain line). The control board portion 41 is arranged through the spacer member 37 in a space between the reflective plate 35 (light guide plate 34) and the back surface portion 12a of the rear housing 12. In this case, an immediately following portion of the FPC 40 connected to the liquid crystal cell 21 is covered with the extension portion 14b of the bezel member 14 from the front side (Z1 side). Thus, according to this embodiment, electrostatic discharge (ESD) is shielded (protected) by the extension portion 14b and hardly reaches the control board portion 41 even when the electrostatic discharge is generated on the front side of the liquid crystal panel 20.

Thus, in the liquid crystal television apparatus 100, even in the case where the front housing 11 holds the liquid crystal panel 20 while pushing the edge 20a on the front side corresponding to the short-side portions 20b of the liquid crystal panel 20, the bezel members 14 made of metal are fixed to the frame member 13 (short-side frame portions 13a), and hence the rigidity (the member strength of the short-side frame portions 13a) of apparatus body 10 including the liquid crystal panel 20 is maintained by the bezel members 14 made of metal, constituted by members different from the front housing 11. Therefore, the rigidity of the apparatus body 10 is ensured on the side of the frame member 13 mounted with the bezel members 14, and hence the frame portion 11c of the front housing 11 can hold the liquid crystal panel 20 while pushing the edge 20a of the liquid crystal panel 20. At this time, the frame portion 11c pushes the edge 20a, and hence the width W1 (see FIG. 1) of the frame portion 11c can be reduced as much as possible within a range where the liquid crystal panel 20 can be reliably held. In other words, the liquid crystal television apparatus 100 is designed such that the outer transverse dimension W3 of the apparatus body 10 is reduced as much as possible while the transverse (long-side) dimension W2 of the display area 20d of the liquid crystal panel 20 is maximized, as shown in FIG. 1.

The frame member 13 (long-side frame portions 13b) and the bezel members 15 made of metal are configured as described above, whereby the edge 20a corresponding to the long-side portions 20c of the liquid crystal panel 20 is held by the following structure according to this embodiment.

Specifically, in a state where the bezel member 15 is mounted on the fixing portion 13d of the frame member 13 (long-side frame portion 13b) by the screw members 92, the edge 20a corresponding to the long-side portion 20c of the liquid crystal panel 20 is pushed by the extension portion 15b of the bezel member 15, and the rear side (Z2 side) of the liquid crystal panel 20 corresponding to a position pushed by the extension portion 15b of the bezel member 15 is supported by the frame member 13 (the supporting portion 13c provided on the long-side frame portion 13b), whereby the liquid crystal panel 20 is held by the front housing 11 and the frame member 13, as shown in FIG. 6.

The lower surface 15f (portion opposed to the edge 20a) of the extension portion 15b of the bezel member 15 is mounted with a cushion member 18 made of the same material as the cushion member 16. Thus, the edge 20a corresponding to the long-side portion 20c of the liquid crystal panel 20 is pushed by the bezel member 15 through the cushion member 18 on the side of the long-side portion 20c of the liquid crystal panel 20, and the rear side (Z2 side) of the liquid crystal panel 20 corresponding to a position pushed by the extension portion 15b of the bezel member 15 is supported by the frame member 13 (the supporting portion 13c provided on the long-side frame portion 13b), whereby the edge 20a of the liquid crystal panel 20 is sandwiched and held from the front side and the rear side (in the direction Z) by the bezel member 15 and the frame member 13 (long-side frame portion 13b).

Although the sectional structure on the upper side (Y1 side) in the case where the apparatus body 10 is viewed from the front side is described above with reference to FIG. 6, the sectional structure on the lower side (Y2 side) in the case where the apparatus body 10 is viewed from the front side is also substantially identical (vertically symmetrical). The ends of the bezel members 14 and 15 are connected (coupled) to each other by unshown screw members, whereby the further rigidity is ensured. A single frame-shaped member formed by coupling the pair of bezel members 14 and the pair of bezel members 15 to each other is mounted on the frame member 13 to surround the liquid crystal panel 20.

Thus, in the liquid crystal television apparatus 100, the front housing 11 (frame portion 11c) holds the liquid crystal panel 20 while pushing the edge 20a corresponding to the short-side portions 20b (see FIG. 2) of the liquid crystal panel 20, and the bezel members 15 (extension portions 15b) hold the liquid crystal panel 20 while pushing the edge 20a corresponding to the long-side portions 20c (see FIG. 2) of the liquid crystal panel 20. Thus, the width of the frame portion 11c on the sides (right and left sides) of the short-side portions 20b in the apparatus body 10 can be reduced (width W1 is further reduced), the strength of the frame member 13 (long-side frame portions 13b) in a direction along the long-side portions 20c can be easily maintained by the bezel members 15 made of metal on the sides (upper and lower sides) of the long-side portions 20c requiring strength larger than that of the short-side portions 20b, and the bezel members 15 can hold the liquid crystal panel 20 while pushing the edge 20a corresponding to the long-side portions 20c of the liquid crystal panel 20. Therefore, also with respect to the liquid crystal television apparatus 100 including the horizontally long liquid crystal panel 20, as shown in FIG. 1, the strength of the apparatus body 10 is maintained, and the width of a frame is further reduced.

According to this embodiment, the bezel member 14 fixed to the fixing portion 13d of the short-side frame portion 13a is formed such that the extension portion 14b extends along arrow X1 from the fixed portion 14a up to the vicinity of a region where the cushion member 16 is arranged, as shown in FIG. 4. Furthermore, the extension portion 14b has such a shape that the extension portion 14b is bent from the position of the fixed portion 14a and extends obliquely forward and thereafter is bent again and extends along arrow X1. In other words, the bezel member 14 is provided with not only the flat fixed portion 14a but also the extension portion 14b having the bent portion 14e that is bent, and hence the bezel member 14 arranged inside the front housing 11 is formed to have larger rigidity (member strength).

As shown in FIG. 6, the bezel member 15 fixed to the fixing portion 13d of the long-side frame portion 13b is formed such that the extension portion 15b is bent and extends along arrow X1 from the fixed portion 15a. In this case, the extension portion 15b is formed such that the tip thereof reaches the edge 20a corresponding to the long-side portion 20c of the liquid crystal panel 20. The aforementioned cushion member 18 is mounted on a portion of the extension portion 15b opposed to the edge 20a. Thus, the bezel member 15 is provided with not only the fixed portion 15a but also the extension portion 15b having the bent portion 15e that is bent, and hence the bezel member 15 arranged inside the front housing 11 is formed to have larger rigidity (member strength). In this manner, the liquid crystal television apparatus 100 is configured.

According to this embodiment, as hereinabove described, the liquid crystal television apparatus 100 includes the front housing (front cabinet) 11 holding the liquid crystal panel 20 while pushing the edge 20a on the front side (Z1 side) corresponding to the short-side portions 20b of the liquid crystal panel 20 and the bezel members 14 made of metal, fixed to the inside of the front housing 11 by the screw members 92, whereby the rigidity (member strength) of the apparatus body 10 including the liquid crystal panel 20 can be maintained by the bezel members 14 made of metal, constituted by the members different from the front housing 11 even in the case where the front housing 11 holds the liquid crystal panel 20 while pushing the edge 20a corresponding to the short-side portions 20b of the liquid crystal panel 20. In other words, the rigidity of the apparatus body 10 is maintained by the bezel members 14, and hence the liquid crystal panel 20 can be held even in a state of ensuring the display area 20d of the liquid crystal panel 20 as wide as possible. Thus, the width of the frame can be further reduced while the rigidity of the apparatus body 10 is ensured.

According to this embodiment, the liquid crystal television apparatus 100 includes the frame member 13 (mold frame) configured to be capable of supporting the rear side (Z2 side) of the liquid crystal panel 20 inside the front housing 11, and the liquid crystal panel 20 is sandwiched and held by the front housing 11 and the frame member 13 (short-side frame portions 13a) in the state where the bezel members 14 are mounted on the frame member 13 by the screw members 92. Thus, the bezel members 14 are mounted on the frame member 13 (short-side frame portions 13a) supporting the liquid crystal panel 20 from the rear side (Z2 side) in the case where the edge 20a on the front side (Z1 side) of the liquid crystal panel 20 is pushed, and hence the rigidity of the frame member 13 (short-side frame portions 13a) can be easily improved. Therefore, the rigidity of the apparatus body 10 in the liquid crystal television apparatus 100 having the liquid crystal panel 20 sandwiched and held by the front housing 11 and the frame member 13 can be easily ensured.

According to this embodiment, the front housing 11 includes the frame portion 11c formed in a frame shape without covering the display area 20d of the liquid crystal panel 20, and the edge 20a on the front side (Z1 side) corresponding to the short-side portions 20b of the liquid crystal panel 20 is pushed by the frame portion 11c and the rear side (Z2 side) of the liquid crystal panel 20 corresponding to the positions pushed by the frame portion 11c is supported by the frame member 13 in the state where the bezel members 14 are mounted on the frame member 13 (short-side frame portions 13a), so that the liquid crystal panel 20 is held by the front housing 11 and the frame member 13. Thus, even in the case where the frame portion 11c of the front housing 11 formed in the frame shape holds the liquid crystal panel 20 while pushing the edge 20a corresponding to the short-side portions 20b of the liquid crystal panel 20, the rigidity of the apparatus body 10 is easily ensured by the bezel members 14, and hence the width W1 (the width W1 in a direction orthogonal to the extensional direction of the frame portion 11c) of the frame portion 11c is reduced as much as possible, whereby a reduction in the width of the frame can be easily realized.

According to this embodiment, the liquid crystal panel 20 is formed to have the rectangular shape by the pair of short-side portions 20b extending in the longitudinal direction (direction Y) and the pair of long-side portions 20c extending in the transverse direction (direction X), and the bezel members 14 are mounted on portions of the frame member 13 supporting the rear side (Z2 side) at positions corresponding to the short-side portions 20b of the liquid crystal panel 20. Furthermore, the edge 20a corresponding to the short-side portions 20b of the liquid crystal panel 20 is pushed by the frame portion 11c of the front housing 11 and the rear side (Z2 side) of the liquid crystal panel 20 corresponding to the positions pushed by the frame portion 11c is supported by the frame member 13 (short-side frame portions 13a), so that the liquid crystal panel 20 is held by the front housing 11 and the frame member 13. Thus, in the liquid crystal television apparatus 100 including the horizontally long (rectangular) liquid crystal panel 20 extending in the direction X, the width of the frame on the sides of the short-side portions 20b (both sides in the transverse direction) (the width W1 of the frame portion 11c) can be reduced while the rigidity of the apparatus body 10 is ensured. Therefore, the outer transverse dimension W3 (see FIG. 1) of the apparatus body 10 can be reduced as much as possible while the transverse (long-side) dimension W2 (see FIG. 1) of the display area 20d in the liquid crystal panel 20 is maximized.

According to this embodiment, the liquid crystal television apparatus 100 further includes the cushion members 16 arranged between the frame portion 11c of the front housing 11 and the edge 20a on the front side (Z1 side) of the liquid crystal panel 20, and the bezel members 14 are mounted on the frame member 13 (short-side frame portions 13a) in a region opposed to the frame member 13 inside the front housing 11 and outside (X2 side) the edge 20a on the front side (Z1 side) of the liquid crystal panel 20. Furthermore, the cushion members 16 are pushed by the frame portion 11c of the front housing 11 and come into contact with the edge 20a on the front side (Z1 side) corresponding to the short-side portions 20b of the liquid crystal panel 20, so that the liquid crystal panel 20 is held. Thus, the cushion members 16 are deformed due to the pushing force of the frame portion 11c and come into close contact with the edge 20a on the front side (Z1 side) of the liquid crystal panel 20 in a state where the frame portion 11c formed in the frame shape holds the liquid crystal panel 20, and hence the region opposed to the frame member 13 (short-side frame portions 13a) inside the front housing 11 is shielded by a surface of the liquid crystal panel 20 and the cushion members 16 and is not visible from the front side (Z1 side) of the liquid crystal panel 20. In other words, the bezel members 14 mounted on the frame member 13 in the region opposed to the frame member 13 inside the front housing 11 are not visible from the front side (Z1 side) of the liquid crystal panel 20, and entry of extraneous material from the front side can be suppressed. Furthermore, the bezel members 14 are not visible from the front side (Z1 side), and hence a reduction in the appearance quality of the liquid crystal television apparatus 100 can be suppressed.

According to this embodiment, the liquid crystal television apparatus 100 further includes the cushion member 17 arranged between the frame member 13 and the rear side (Z2 side) of the liquid crystal panel 20 corresponding to the positions pushed by the frame portion 11c, and the rear side of the liquid crystal panel 20 corresponding to the positions pushed by the frame portion 11c is supported by the frame member 13 through the cushion member 17, so that the liquid crystal panel 20 is held. Thus, the front side (Z1 side) and the rear side (Z2 side) of the liquid crystal panel 20 can be sandwiched and held by both the cushion members 16 and 17, and hence the liquid crystal panel 20 can be reliably held. Consequently, the positional displacement of the liquid crystal panel 20 can be suppressed, and hence a situation where a user must view an inclined display image resulting from the positional displacement of the liquid crystal panel 20 can be suppressed.

According to this embodiment, the bezel members 14 include the fixed portions 14a coming into contact with the frame member 13 (short-side frame portions 13a), fixed to the frame member 13 and the extension portions 14b formed to extend along arrow X1 from the fixed portions 14a up to the vicinities of the regions where the cushion members 16 are arranged. Thus, the bezel members 14 are provided with not only the fixed portions 14a but also the extension portions 14b, and hence the bezel members 14 arranged inside the front housing 11 can be formed to have larger rigidity (member strength). Furthermore, the extension portions 14b provided on the bezel members 14 are formed to extend up to the vicinities of the regions where the cushion members 16 are arranged, and hence external force (impulsive force) can be absorbed by further deformation of the cushion members 16 even in the case where the cushion members 16 are deformed due to the pushing force of the frame portion 11c or sudden external force and come into contact with the extension portions 14b of the bezel members 14. Thus, application of the sudden external force (impulsive force) to the bezel members 14 is suppressed, and hence distortion of the apparatus body 10 can be suppressed.

According to this embodiment, the bezel members 14 and the frame member 13 have the through-holes 14c and the through-holes 13e provided to fasten the bezel members 14 and the frame member 13 to each other by the screw members 92. Thus, the bezel members 14 and the frame member 13 can be fastened together by the screw members 92, and hence the bezel members 14 can be reliably mounted on the frame member 13. Consequently, the rigidity (member strength) of the frame member 13 can be reliably improved.

According to this embodiment, the liquid crystal television apparatus 100 further includes the rear housing 12, and the bezel members 14 and the frame member 13 are configured to be fastened to the rear housing 12 by the screw members 92 through the through-holes 14c and the through-holes 13e, respectively. Thus, the bezel members 14, the frame member 13, and the rear housing 12 can be strongly fixed by the screw members 92, and hence the rigidity of the apparatus body 10 can be easily ensured.

According to this embodiment, the liquid crystal television apparatus 100 further includes the bezel members 15 made of metal, arranged inside the front housing 11. Furthermore, the edge 20a on the front side (Z1 side) corresponding to the short-side portions 20b of the liquid crystal panel 20 is pushed by the front housing 11 and the edge 20a corresponding to the long-side portions 20c of the liquid crystal panel 20 is pushed by the extension portions 15b of the bezel members 15, so that the liquid crystal panel 20 is held by the front housing 11 and the bezel members 15. Thus, the width of the frame along the edge 20a corresponding to the short-side portions 20b of the liquid crystal panel 20 held by the front housing 11 can be actively reduced, and the bezel members 15 can push the edge 20a corresponding to the long-side portions 20c of the liquid crystal panel 20 and hold the liquid crystal panel 20 while the rigidity of the edge 20a corresponding to the long-side portions 20c requiring larger rigidity in the apparatus body 10 is ensured by the bezel members 15. Therefore, the liquid crystal television apparatus 100 in which the width of the frame is actively reduced and the rigidity of the apparatus body 10 is reliably ensured can be obtained.

According to this embodiment, the bezel members 14 and the bezel members 15 are coupled to each other to form a frame-shaped bezel member. Thus, the bezel members 14 and the bezel members 15 are coupled to each other as the single frame-shaped bezel member, and hence the rigidity of the bezel member constituted by the coupled bezel members 14 and 15 can be further improved, unlike the case where the bezel members 14 and bezel members 15 are not coupled but mounted separately. Consequently, the rigidity of the apparatus body 10 can be more reliably ensured, and the width of the frame can be more actively reduced.

According to this embodiment, the liquid crystal panel 20 is formed to have the rectangular shape by the pair of short-side portions 20b extending in the longitudinal direction (direction Y) and the pair of long-side portions 20c extending in the transverse direction (direction X). Furthermore, the pair of bezel members 14 are provided, and each of the pair of bezel members 14 is arranged at a position corresponding to each of the short-side portions 20b of the liquid crystal panel 20. In addition, the pair of bezel members 15 are provided, and each of the pair of bezel members 15 is arranged at a position corresponding to each of the long-side portions 20c of the liquid crystal panel 20. Moreover, the pair of bezel members 14 and the pair of bezel members 15 form the frame-shaped bezel member surrounding the liquid crystal panel 20. Thus, the pair of bezel members 14 and the pair of bezel members 15 form the frame-shaped member surrounding the liquid crystal panel 20 in correspondence to the liquid crystal panel 20 having the rectangular shape, whereby the edge 20a of the liquid crystal panel 20 can be reliably pushed while the rigidity of the bezel member is further improved.

According to this embodiment, the bezel members 14 include the fixed portions 14a coming into contact with the frame member 13, fixed to the frame member 13 and the extension portions 14b having the bent portions 14e that are bent, extending from the fixed portions 14a toward the edge 20a of the liquid crystal panel 20 pushed by the front housing 11. Thus, the extension portions 14b have the bent portions 14e that are bent, whereby the rigidity (member strength) of the bezel members 14 can be further improved, unlike the case where the extension portions 14b are flatly formed.

According to this embodiment, the bezel members 14 further include the side surface portions 14d extending from the outer edge of the fixed portions 14a opposite to the extension portions 14b along a direction (along arrow Z2) from the front side (Z1 side) of the liquid crystal panel 20 toward the rear side (Z2 side) of the liquid crystal panel 20. Thus, the bezel members 14 are provided with the side surface portions 14d in addition to the extension portions 14b having the bent portions 14e, whereby the rigidity (member strength) of the bezel members 14 can be further improved.

According to this embodiment, the liquid crystal television apparatus 100 further includes the FPC 40 configured to connect the liquid crystal panel 20 to the control board portion 41. Furthermore, the extension portion 14b of the bezel member 14 is formed such that at least a part of the extension portion 14b covers the FPC 40 (the immediately following portion of the FPC 40 connected to the liquid crystal cell 21). Thus, the FPC 40 can be protected by the extension portion 14b of the bezel member 14 made of metal when the electrostatic discharge is generated, and hence malfunction or damage of the FPC 40 and the control board portion 41 connected to the FPC 40 resulting from the electrostatic discharge can be suppressed.

According to this embodiment, the extension portion 14b of the bezel member 14 is arranged to cover the FPC 40 from the front side (Z1 side) of the liquid crystal panel 20. Thus, the FPC 40 can be protected by the extension portion 14b of the bezel member 14 made of metal on the front side (Z1 side) of the liquid crystal panel 20 where the electrostatic discharge is easily generated, and hence malfunction or damage of the FPC 40 and the control board portion 41 connected to the FPC 40 resulting from the electrostatic discharge can be reliably suppressed.

According to this embodiment, the frame member 13 is formed with the rib 13f protruding toward the liquid crystal panel 20 (Z1 side), coming into contact with the bezel member 14. Thus, the rib 13f coming into contact with the bezel member 14 can suppress the movement of the bezel member 14, and hence backlash of the bezel member 14 can be suppressed.

According to this embodiment, the front housing 11 is formed with the rib 11g protruding inward (to the Z2 side) from the inner surface 11f of the front housing 11, coming into contact with a surface of the bezel member 14 opposite to a surface of the bezel member 14 coming into contact with the rib 13f, and the rib 13f and the rib 11g are arranged to be opposed to each other. Thus, the bezel member 14 can be sandwiched by the rib 13f and the rib 11g from both sides, and hence the movement of the bezel member 14 can be more reliably suppressed. Thus, backlash of the bezel member 14 can be further suppressed.

According to this embodiment, the front housing 11 and the frame member 13 are made of resin. Thus, the front housing 11 and the frame member 13 can be easily molded, and the weight of the apparatus body 10 can be reduced as compared with the case where the front housing is made of metal. In the case where the front housing 11 is made of resin, it is more difficult to reduce the width of the frame while the rigidity is ensured, unlike the case where the front housing 11 is made of metal. In this case, the bezel members 14 made of metal are provided, whereby the width of the frame can be reduced while the rigidity of the apparatus body 10 is ensured, and hence the present invention is particularly effective.

(First Modification)

Figure 7:
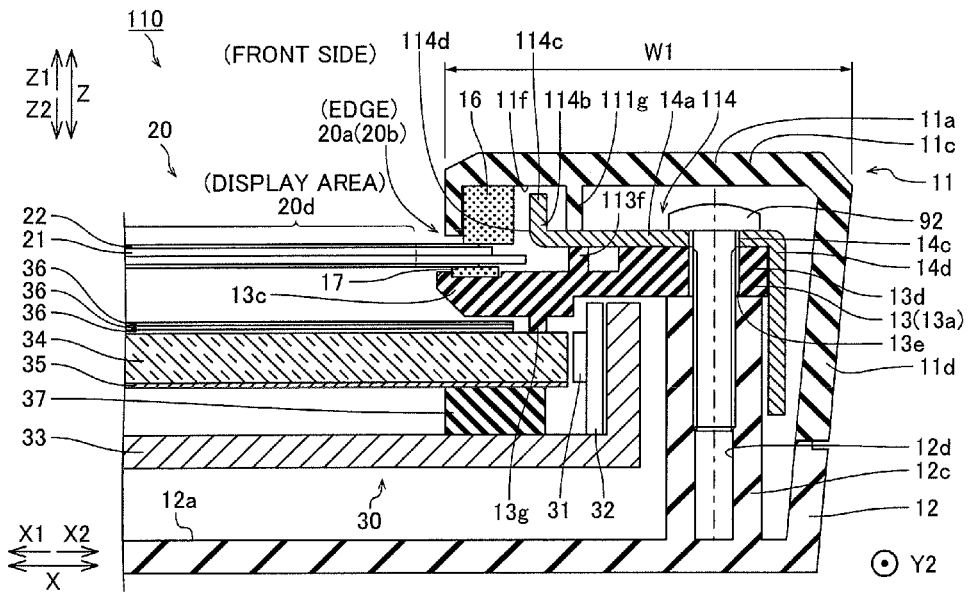
FIG. 7 is a sectional view showing a structure of holding a liquid crystal panel as viewed along the short-side direction (direction Y) of the liquid crystal panel in a liquid crystal television apparatus according to a first modification of the present invention.

A first modification is now described with reference to FIGS. 1, 4, and 7. In this first modification, a bezel member 114 having a portion folded at about 90 degrees in an end region of an extension portion 114b is mounted on a frame member 13 (short-side frame portion 13a), as shown in FIG. 7. The bezel member 114 is an example of the "first bezel member" in the present invention. In the figure, a structure similar to that of the liquid crystal television apparatus 100 according to the aforementioned embodiment is denoted by the same reference numerals.

In a liquid crystal television apparatus 110 according to the first modification of the present invention, the bezel member 114 fixed to a fixing portion 13d of the short-side frame portion 13a is formed such that the extension portion 114b extends from a fixed portion 14a up to the vicinity of a region where a cushion member 16 is arranged along arrow X1, as shown in FIG. 7. The extension portion 114b has a bent portion 114d folded at about 90 degrees from an X1 side to a Z1 side (front side) before the cushion member 16 and an end 114c slightly extending toward a frame portion 11c. Therefore, the bezel member 114 is folded in the middle of the extension portion 114b, and hence the rigidity of the extension portion 114b is further improved. The extension portion 114b linearly extends along arrow X1 from the fixed portion 14a and thereafter is bent to the Z1 side. Therefore, a rib 111g of a front housing 11 pushing a portion of the extension portion 114b extending along arrow X1 is configured such that the protrusion length thereof along arrow Z2 is longer than that of the rib 11g (see FIG. 4) according to the aforementioned embodiment. In contrast, a rib 113f of the frame member 13 (short-side frame portion 13a) is configured such that the protrusion length along arrow Z1 is shorter than that of the rib 13f (see FIG. 4) according to the aforementioned embodiment.

The bezel member 114 shown in FIG. 7 is provided on the back side of the frame portion 11c on the right and left sides when an apparatus body 10 (see FIG. 1) is viewed from the front side. The remaining structure of the liquid crystal television apparatus 110 (see FIG. 1) according to the first modification is similar to that of the liquid crystal television apparatus 100 according to the aforementioned embodiment.

According to the first modification, as hereinabove described, the bent portion 114d of the extension portion 114b of the bezel member 114 is formed by being folded at about 90 degrees in the vicinity of the cushion member 16. Thus, the bent portion 114d of the extension portion 114b is folded, whereby not only the rigidity of the extension portion 114b but also the rigidity (member strength) of the entire bezel member 114 can be further improved. Therefore, the bezel member 114 can be formed with less metal material in the case where the bezel member 114 is formed to ensure rigidity equivalent to that of the bezel member 14 (see FIG. 4) according to the aforementioned embodiment, for example, and hence the weight (thickness) of the bezel member 114 can be reduced. The remaining effects of the first modification are similar to those of the aforementioned embodiment.

(Second Modification)

Figure 8:
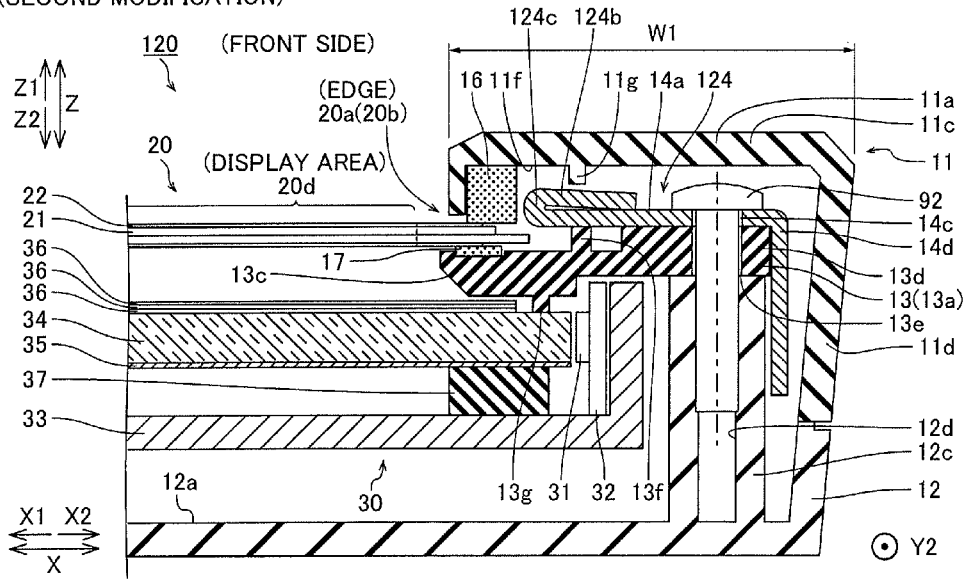
FIG. 8 is a sectional view showing a structure of holding a liquid crystal panel as viewed along the short-side direction (direction Y) of the liquid crystal panel in a liquid crystal television apparatus according to a second modification of the present invention.

A second modification is now described with reference to FIGS. 1, 4, and 8. In this second modification, a bezel member 124 having a portion on which hemming is performed in the middle of an extension portion 124b is mounted on a frame member 13 (short-side frame portion 13a), as shown in FIG. 8. The bezel member 124 is an example of the "first bezel member" in the present invention. In the figure, a structure similar to that of the liquid crystal television apparatus 100 according to the aforementioned embodiment is denoted by the same reference numerals.

In a liquid crystal television apparatus 120 according to the second modification of the present invention, the bezel member 124 fixed to a fixing portion 13d of the short-side frame portion 13a is formed such that the extension portion 124b extends along arrow X1 from a fixed portion 14a to stop short of a region where a cushion member 16 is arranged, as shown in FIG. 8. The extension portion 124b is provided with a bent portion 124c folded at about 180 degrees from an X1 side to an X2 side (in an opposite direction) before a cushion member 16, on which hemming is performed. Therefore, the bezel member 124 is provided with the bent portion 124c on which hemming is performed on the extension portion 124b, and hence the rigidity of the extension portion 124b is further improved. The bezel member 124 shown in FIG. 8 is provided on the back side of a frame portion 11c on the right and left sides when an apparatus body 10 (see FIG. 1) is viewed from the front side. The remaining structure of the liquid crystal television apparatus 120 according to the second modification is similar to that of the liquid crystal television apparatus 100 according to the aforementioned embodiment.

According to the second modification, as hereinabove described, the bent portion 124c of the extension portion 124b of the bezel member 124 is formed by hemming in the vicinity of the cushion member 16. Thus, the bent portion 124c of the extension portion 124b is formed by hemming, whereby not only the rigidity of the extension portion 124b but also the rigidity (member strength) of the entire bezel member 124 can be further improved. Therefore, the bezel member 124 can be formed with less metal material in the case where the bezel member 124 is formed to ensure rigidity equivalent to that of the bezel member 14 (see FIG. 4) according to the aforementioned embodiment, for example, and hence the weight (thickness) of the bezel member 124 can be reduced. The remaining effects of the second modification are similar to those of the aforementioned embodiment.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the present invention is applied to the liquid crystal television apparatus 100, 110, or 120 as the example of the display device in each of the aforementioned embodiment and the aforementioned first and second modifications of the embodiment, the present invention is not restricted to this. The present invention is also applicable to another display device, such as a display monitor of a personal computer, other than the liquid crystal television apparatus, for example.

While the bezel members 14 (114, 124) are provided only on the back side of the frame portion 11c corresponding to the short-side portions 20b on the right and left sides when the apparatus body 10 is viewed from the front side and the bezel members 15 are provided on the back side of the frame portion 11c corresponding to the long-side portions 20c on the upper and lower sides when the apparatus body 10 is viewed from the front side in each of the aforementioned embodiment and the aforementioned first and second modifications of the embodiment, the present invention is not restricted to this. For example, the apparatus body may alternatively be configured such that the bezel members 14 (114, 124) are arranged not only on the back side of the frame portion 11c corresponding to the short-side portions 20b on the right and left sides but also on the back side of the frame portion 11c corresponding to the long-side portions 20c on the upper and lower sides. In other words, the frame portion 11c of the front housing 11 may alternatively hold the liquid crystal panel 20 while pushing the edge 20a of the liquid crystal panel 20 over the entire circumference. In this case, the frame member 13 is mounted with the bezel members 14 over the entire circumference (in the directions X and Y). Thus, the width (the width W1) in a horizontal direction as well as the width in a vertical direction of the frame of the apparatus body 10 can be reduced while the rigidity of the apparatus body 10 is ensured. Furthermore, a reduction in the width of the frame over the entire circumference of the edge 20a in the liquid crystal panel 20 is effective particularly with respect to a small-sized liquid crystal display device.

While the extension portions 14b (114b, 124b, 15b) of the bezel members 14 (114, 124, 15) push the supporting portion 13c of the frame member 13 rearward to hold the light guide plate 34 in each of the aforementioned embodiment and the aforementioned first and second modifications of the embodiment, the present invention is not restricted to this. According to the present invention, the bezel members 14 (114, 124, 15) may not push the frame member 13 rearward with providing no rib 13f (113f) on the frame member 13.

The bezel members 14 and the bezel members 15 configured as different members in each of the aforementioned embodiment and the aforementioned first and second modifications of the embodiment are coupled to each other, whereby the "first bezel member" according to the present invention may alternatively be configured as one frame-shaped member.

While the present invention is applied to the structure of holding the liquid crystal panel 20 having the liquid crystal cell 21 in each of the aforementioned embodiment and the aforementioned first and second modifications of the embodiment, the present invention is not restricted to this. The present invention may alternatively be applied to a display device including a plasma display panel, an organic EL panel, or the like other than the liquid crystal panel.

What is claimed is:

1. A display device comprising:
   a display portion;
   a front housing that holds the display portion while pushing at least a part of an edge on a front side of the display portion; and
   a first bezel made of metal, arranged inside the front housing and separated from the display portion at a portion where the front housing pushes the edge of the display portion,
   a second bezel made of metal, arranged inside the front housing, wherein
   the part of the edge of the display portion other than the part pushed by the front housing is pushed by the second bezel, the display portion is held by the front housing and the second bezel.

2. The display device according to claim 1, further comprising a supporting portion that is capable of supporting a rear side of the display portion inside the front housing, wherein
   the display portion is sandwiched and held by the front housing and the supporting portion from the front side and the rear side in a state where the first bezel is mounted on the supporting portion.

3. The display device according to claim 2, wherein
   the front housing includes a frame portion formed in a frame shape without covering a display area of the display portion, and
   at least the part of the edge on the front side of the display portion is pushed by the frame portion of the front housing and the rear side of the display portion corresponding to a position pushed by the frame portion is supported by the supporting portion in the state where the first bezel is mounted on the supporting portion, so that the display portion is held by the front housing and the supporting portion.

4. The display device according to claim 3, wherein
   the display portion is formed to have a rectangular shape by a pair of short-side portions extending in a longitudinal direction and a pair of long-side portions extending in a transverse direction,
   the first bezel is mounted on a portion of the supporting portion supporting the rear side at a position corresponding to each of at least the short-side portions of the display portion, and
   the edge corresponding to at least the short-side portions of the display portion is pushed by the frame portion of the front housing and the rear side of the display portion corresponding to the position pushed by the frame portion is supported by the supporting portion, so that the display portion is held by the front housing and the supporting portion.

5. The display device according to claim 3, further comprising a first elastic portion arranged between the frame portion of the front housing and the edge on the front side of the display portion, wherein
   the first bezel is mounted on the supporting portion in a region opposed to the supporting portion inside the front housing and outside the edge on the front side of the display portion, and
   the first elastic portion is pushed by the frame portion of the front housing and comes into contact with at least the part of the edge on the front side of the display portion, so that the display portion is held.

6. The display device according to claim 5, further comprising a second elastic portion arranged between the supporting portion and the rear side of the display portion corresponding to the position pushed by the frame portion, wherein
   the rear side of the display portion corresponding to the position pushed by the frame portion is supported by the supporting portion through the second elastic portion, so that the display portion is held.

7. The display device according to claim 5, wherein
   the first bezel includes a fixed portion coming into contact with the supporting portion, fixed to the supporting portion and an extension portion formed to extend from the fixed portion up to a vicinity of a region where the first elastic portion is arranged.

8. The display device according to claim 2, wherein
each of the first bezel and the supporting portion has a through-hole provided to fasten the first bezel and the supporting portion to each other by a fastening portion.

9. The display device according to claim 8, further comprising a rear housing, wherein
each of the first bezel and the supporting portion is fastened to the rear housing by the fastening portion through the through-hole.

10. The display device according to claim 1, wherein
the first bezel and the second bezel are coupled to each other to form a frame-shaped bezel.

11. The display device according to claim 10, wherein
the display portion is formed to have a rectangular shape by a pair of short-side portions extending in a longitudinal direction and a pair of long-side portions extending in a transverse direction,
a pair of first bezels are provided, and each of the pair of first bezels is arranged at a position corresponding to each of the pair of short-side portions of the display portion,
a pair of second bezels are provided, and each of the pair of second bezels is arranged at a position corresponding to each of the pair of long-side portions of the display portion, and
the pair of first bezels and the pair of second bezels form the frame-shaped bezel surrounding the display portion.

12. The display device according to claim 1, wherein
the first bezel includes a fixed portion coming into contact with the supporting portion, fixed to the supporting portion and an extension portion having a bent portion that is bent, extending from the fixed portion toward the edge of the display portion pushed by the front housing.

13. The display device according to claim 12, wherein
the bent portion of the extension portion of the first bezel is formed by folding or hemming.

14. The display device according to claim 12, wherein
the first bezel further includes a side surface portion extending from an outer edge of the fixed portion opposite to the extension portion along a direction from the front side of the display portion toward a rear side of the display portion.

15. The display device according to claim 12, further comprising a wiring portion that connects the display portion to a control board, wherein
the extension portion of the first bezel is formed such that at least a part of the extension portion covers the wiring portion.

16. The display device according to claim 15, wherein
the extension portion of the first bezel is arranged to cover the wiring portion from the front side of the display portion.

17. The display device according to claim 2, wherein
the supporting portion is formed with a supporting portion side contact portion protruding toward the display portion, coming into contact with the first bezel.

18. The display device according to claim 17, wherein
the front housing is formed with a front housing side contact portion protruding inward from an inner surface of the front housing, coming into contact with a surface of the first bezel opposite to a surface of the first bezel coming into contact with the supporting portion side contact portion, and
the supporting portion side contact portion and the front housing side contact portion are arranged to be opposed to each other.

19. The display device according to claim 2, wherein
the front housing and the supporting portion are made of resin.

* * * * *